United States Patent [19]
Kurihara

[11] Patent Number: 5,596,964
[45] Date of Patent: Jan. 28, 1997

[54] INTAKE AND EXHAUST VALVES AND INTAKE PORT OF INTERNAL COMBUSTION ENGINE

[75] Inventor: Katsumi Kurihara, Nagoya, Japan

[73] Assignee: Ryobi Limited, Tokyo, Japan

[21] Appl. No.: 544,761

[22] Filed: Oct. 18, 1995

[30] Foreign Application Priority Data

Oct. 19, 1994 [JP] Japan .................................. 6-281308

[51] Int. Cl.$^6$ ...................................................... F02B 31/00
[52] U.S. Cl. ................. 123/306; 123/90.67; 123/188.14; 123/188.13
[58] Field of Search ......................... 123/188.14, 188.12, 123/188.13, 188.17, 90.67, 306

[56] References Cited

U.S. PATENT DOCUMENTS

| | | | |
|---|---|---|---|
| 2,574,120 | 11/1951 | Rich | 123/90.67 |
| 4,574,751 | 3/1986 | Sugiyama et al. | 123/188.14 |
| 4,829,952 | 5/1989 | Barker | 123/90.67 |
| 5,245,964 | 9/1993 | Matsuo et al. | 123/188.14 |
| 5,265,568 | 11/1993 | Nakagawa | 123/188.14 |

*Primary Examiner*—Erick R. Solis
*Attorney, Agent, or Firm*—Brooks & Kushman P.C.

[57] ABSTRACT

Each of intake and exhaust valves of an internal combustion engine has a valve retainer provided with a center hole through which the upper portion of each valve stem passes, a flange and a raised portion surrounded by the flange and around the center hole, a groove formed around the center hole, on the raised portion for receiving a pin inserted into a hole formed in the upper portion of the valve stem. The valve retainer can be easily assembled with a valve spring. Further, a cylinder head has an intake port comprising a lateral path which is in shape of a deep pan in cross section and whose height is gradually decreased from the inlet of the lateral path to a vertical path whose lower end has an opening portion to be opened and closed by a valve portion of the intake valve. Thereby, the mixing state of fuel and air is improved.

8 Claims, 8 Drawing Sheets

5,596,964

INTAKE AND EXHAUST VALVES AND INTAKE PORT OF INTERNAL COMBUSTION ENGINE

BACKGROUND OF THE INVENTION

This invention relates to intake and exhaust valves and an intake port in an internal combustion engine, and more particularly to an improved structure of a valve spring retainer or shoe and an improved shape of the intake port in the internal combustion engine.

In general, in order to increase a combustion efficiency of an internal combustion engine, a valve spring retainer must be designed properly to open and close accurately intake and exhaust valves, an intake port must be properly designed to enhance an intake efficiency and an enlarged spiral vortex in the axial direction of a cylinder must be generated. Thus, contact between air and fuel in the combustion chamber is enhanced.

In these countermeasures, a conventional structure of the valve spring retainer of each of intake and exhaust valves is shown in FIGS. 9 to 11. In FIG. 9, a cylinder head 1 has two valve guides 3, 3 therein for guiding the valve stems 8, 8 of intake and exhaust valves $V_1$, $V_2$ so as to be moved in their axial direction. Each valve stem 8a, has at its upper portion, a cut portion 5 which is engaged with a valve spring retainer 80 via a pair of split cotters 41a, 41b. Two valve springs 9, 9 are held between a cylinder head 1 and each valve spring retainer 80, and the distal end 40 of each of rocker arms abuts against the upper end of each valve stem 8a to move each valve stem 8a upward and downward against the spring force of each valve spring 9 thereby to open and close two opening portions 60, 60 of intake and exhaust ports K, H with two valve portions 8b, 8b abutting against two valve seats 2,2, respectively. The cotters 41a, 41b are inserted into a tapered hole 80a of each valve retainer 80 while holding the cut portion 5 of the valve stem 8a therebetween as shown in FIGS. 9 to 11. The cotters 41a, 41b are in the shape of a wedge and have tapered surfaces $T_s$, $T_s$, respectively. Therefore, if accuracy of finishing for the valve retainer 80 and the cotters 41a, 41b is not good, for example, those members may be assembled in a state shown in FIG. 12 wherein the cotters 41a, 41b are located in a raised position from a normal position. In this case, the valve spring 9 is compressed by a bigger force than a normal force. That is, a bigger force is necessary for opening the opening portion 60 by lowering the intake valve $V_1$ with the rocker arm 40. Therefore, the compressed length of the valve spring 9 (a force exerted on the intake valve $V_1$ by the valve spring 9) is not uniform to differentiate the repulsive force of the valve spring 9 from its design value. This causes various problems.

Further, with respect to the shape of the conventional intake port, a lateral path member 6 for the intake port K with a simple uniform circular section (FIGS. 12, 13) is disposed perpendicularly to the center axis C—C of the cylinder head 1. Therefore, tumbler flow lacks velocity of component in the direction of the center axis C—C of the cylinder head 1, and the sectional area of a connecting portion S between a lateral path 61, provided in the lateral path member 6, of the intake port K and a vertical path 62 connected to the inner end of the lateral path 61 and accommodating the lower portion of the valve stem 8a is small to decrease intake efficiency of admission of a mixture of fuel and air thereby to cause various problems.

SUMMARY OF THE INVENTION

It is an object to provide a structure of intake and exhaust valves in which a valve retainer of each valve can be always assembled with the upper portion of each valve stem in a normal state to operate stably a valve spring provided between the valve retainer and a wall of a cylinder head.

It is another object to provide a structure of an intake port which can generate sufficient tumbler flow in the direction of the center axis of a cylinder with respect to intake mixture of air and fuel, flowing into a combustion chamber to enhance contact between air and fuel thereby to increase combustion efficiency in an internal combustion engine.

According to one aspect of this invention, there is provided a structure of intake and exhaust valves in a combustion engine in which intake and exhaust ports are opened and closed by intake and exhaust valves, respectively, the intake and exhaust valves having valve portions for opening and closing the opening portions of the intake and exhaust ports and valve stems for supporting the valve portions, each of the valve stems being provided, at its upper portion, with a valve retainer for receiving a spring force of a valve spring, the valve stems being engaged with a rocker arm to be moved so as to open and close the intake and exhaust ports, cooperating with the valve spring, wherein each of the valve stems has means for holding a connecting member to be detachably held by the valve stem, the valve retainer comprising a center hole through which an upper portion of the valve stem passes, means for receiving an upper portion of the valve spring provided between the valve retainer and a wall of a cylinder head of the internal combustion engine, and means for supporting the connecting member held by the upper portion of the valve stem.

According to another aspect of this invention, there is provided a structure of an intake port in an internal combustion engine in which mixture of air and fuel is supplied into a cylinder through the intake port, the intake port comprising a first vertical path, provided in a cylinder head, extending parallel to an axis of a cylinder, part of a valve stem of an intake valve being accommodated in the first vertical path, the first vertical path being opened to a combustion chamber of the cylinder through an opening portion which is opened and closed by a valve portion of the intake valve, a second lateral path connected to the first vertical path and extending perpendicularly to an axis of the first vertical path, wherein the second lateral path has a shape of a deep pan in cross section which comprises a lateral straight side, two vertical sides suspended from opposite ends of the lateral straight side and a semi-circular side communicated with respective lower ends of the two vertical sides, height of the second lateral path in a direction of the axis of the cylinder being gradually decreased from an inlet of the second lateral path to the first vertical path.

In the above structure of intake and exhaust valves, since the valve retainer can always receive stably a pin as a connecting member detachably held, in a normal state, on an upper portion of each valve stem passing through the center hole of the valve retainer, the repulsive force of valve springs, exerted on each valve retainer is uniform with respect to respective cylinders to be manufactured. Further, the pin as the connecting member is simply mounted on the groove corresponding to the pin, the assembly of the valve retainer, the valve stem and the valve spring is facilitated.

Further, in the structure of the intake port, since the lateral path has a shape of a deep pan in cross section to enlarge the area of a connecting portion between the inner end of the lateral path and the vertical path and the height of the lateral path is gradually decreased toward the vertical path whose lower end is opened and closed by a valve portion of the intake valve, the velocity of mixture of air and fuel becomes large in the vertical path to generate properly a tumbler flow.

Further objects and advantageous effects will now be explained in more detail with reference to the following drawings.

DESCRIPTION OF THE PREFERRED EMBODIMENTS

An embodiment of this invention will now be explained with reference to FIGS. 1 to 5.

Figure 1:
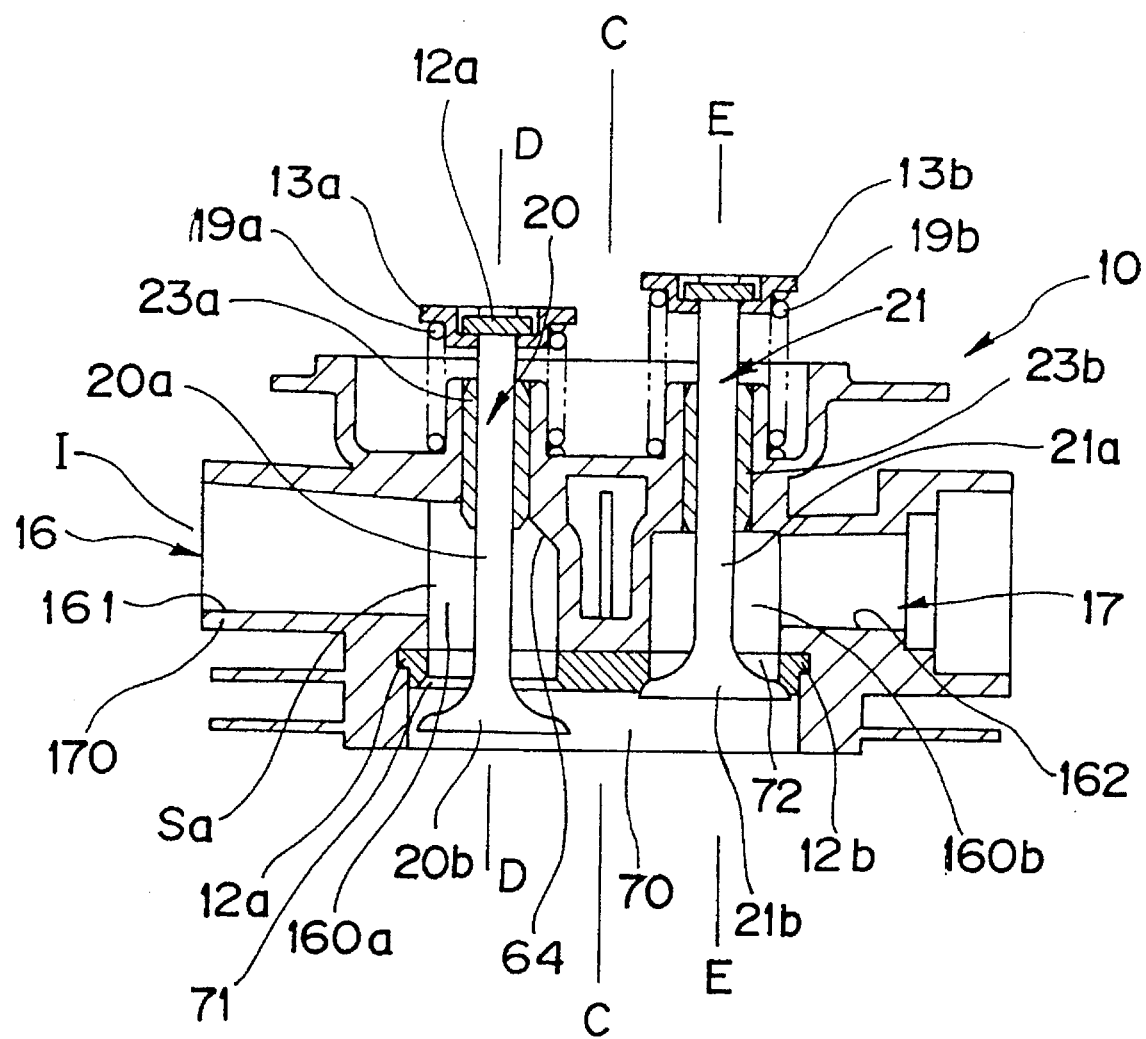
FIG. 1 shows a sectional view of a cylinder head according to this invention.

FIG. 1 shows a cylinder head 10 of an internal combustion engine. The cylinder head 10 has an intake port 16 on one side thereof and an exhaust port 17 on the other side thereof. The intake port 16 has a lateral path 161 provided in a lateral path member 170 which is disposed perpendicularly to the direction of the center axis C—C of the cylinder head 10. The lateral path 161 is connected, at its inner end, to a vertical path 160a disposed parallel to the direction of the axis C—C of the cylinder head 10. The intake port 16 comprises the lateral path 161 for guiding mixture of fuel and air into a combustion chamber 70 and the vertical path 160a for directing the mixture from the lateral path 161 to the combustion chamber 70 through an opening portion 71 provided at the lower end of the vertical path 160a so as to be surrounded by a valve seat 12a. The exhaust port 17 has a lateral path 162 which is disposed perpendicularly to the direction of the center axis C—C of the cylinder head 10, and the lateral path 162 is connected to a vertical path 160b disposed parallel to the diction of the center axis C—C of the cylinder head 10. The exhaust port 17 comprises the lateral path 162 for discharging exhaust gas outward, and the vertical path 160b having, at its lower end, an opening portion 72 surrounded by a valve seat 12b. The cylinder head 10 has, at its upper end portion, two valve guides 23a, 23b along which two valve stems 20a, 21a of intake and exhaust valves 20, 21 are moved upward and downward, respectively. When the valve stems 20a, 20b are moved upward to close the opening portions 71, 72, the valve portions 20b, 21b of the intake and exhaust valve 20, 21 abut against the two valve seats 12a, 12b disposed at the lower end of the two vertical paths 160a, 160b, respectively. At the top portions of the valve stems 20a, 20b are engaged with two valve retainers 13a, 13b for holding the upper ends of two valve springs 19a, 19b, respectively. The structure of the intake valve 20 including the valve retainer 13a is the same as that of the exhaust valve 21. Therefore, only the structure of the intake valve 20 will now be explained with reference to FIGS. 2 to 5. The valve retainer 13a is in the shape of an ashtray and comprises a flange 13f, a center recess 13g surrounded by the flange 13f and a center raised portion 13b having a center circle portion $13b_1$ and two side portions $13b_2$, $13b_2$ diametrically projected from the center circle portion $13b_1$ to the inner wall 15a of the center recess 13g. The two side portions $13b_2$, $13b_2$ have two semi-circular grooves 14a, 14a in cross section for receiving a pin 12a made of steel in an unrotatable manner about the axis D—D of the valve stem 20a. The pin 12a and the grooves 14a contact each other with a wide contacting area so that the valve retainer can support the pin 12a stably. The pin 12a is detachably inserted into a hole 20h provided horizontally at the top portion of the valve stem 20a. The pin 12a has a length slightly shorter than the diameter of the center recess 13g of the valve retainer 13a and functions as a connecting member for transmitting movement of the intake valve 20 to the valve retainer 13a. At the center of the center raised portion $13b_1$ is provided a center hole 16a through which the upper portion of the valve stem 20a passes upward. The semi-circular grooves 14a, 14a function as a supporting means for supporting the pin 12a in an unrotatable manner about the axis D—D of the valve stem 20a and with a wide contacting area between the grooves 14a and the pin 12a, and the hole 20h provided in the upper portion of the valve stem 20a functions as means for holding detachably the pin 12a made of steel. The center recess 13g is formed in a shallow cup portion 55 which is inserted into the upper end of the valve spring 19a in the shape of a coil, and the upper end of the valve spring 19a abuts against the lower face of the flange 13f of the retainer 13a. The outer surface of the cup portion 55 inserted into the upper end of the valve spring 19a and the lower face of the flange 13f function as means for receiving the upper end of the valve spring 19a.

The valve retainer 13a is assembled with the valve spring 19a in the following manner.

First, the valve spring 19a is engaged with a projection 40 of the cylinder head 10 in an upright manner with the upper portion of the valve stem 20a being located in the center of the valve spring 19a. Then, the valve retainer 13a is set in such a manner that the upper end portion of the valve stem 20a passes upward through the center hole 16a of the valve retainer 13a with the lower end of the flange 13f thereof being mounted on the upper end of the valve spring 19a. Thereafter, the valve retainer 13a is moved downward so that the valve spring 19a is pushed down to expose the upper end portion of the valve stem 13a. With this state, the pin 12a is inserted into the horizontal hole 20h of the valve stem 20a. The valve retainer 13a is then released so that the grooves 14a, 14a receive the opposite ends of the pin 12a. Thus, the valve stem 20a is connected to the valve spring 19a through the valve retainer 13a. Since each of the grooves 14a, 14a has a semi-circular shape in section, the contacting area of the pin 12a and the grooves 14a is large. Therefore, the pin 12a can be stably supported by the valve retainer in an unrotatable manner about the axis D—D of the valve stem 20. Further, the assembly of the valve spring 19a and the valve retainer 13a can be remarkably facilitated. In addition, this structure does not need precision of finishing each member. Therefore, the valve retainer 13a can be always set at a normal position to receive a constant repulsive force from the valve spring 19a, and a precision press and a precision forging can be used for manufacturing each member to decrease manufacturing cost for each member.

Figure 2:
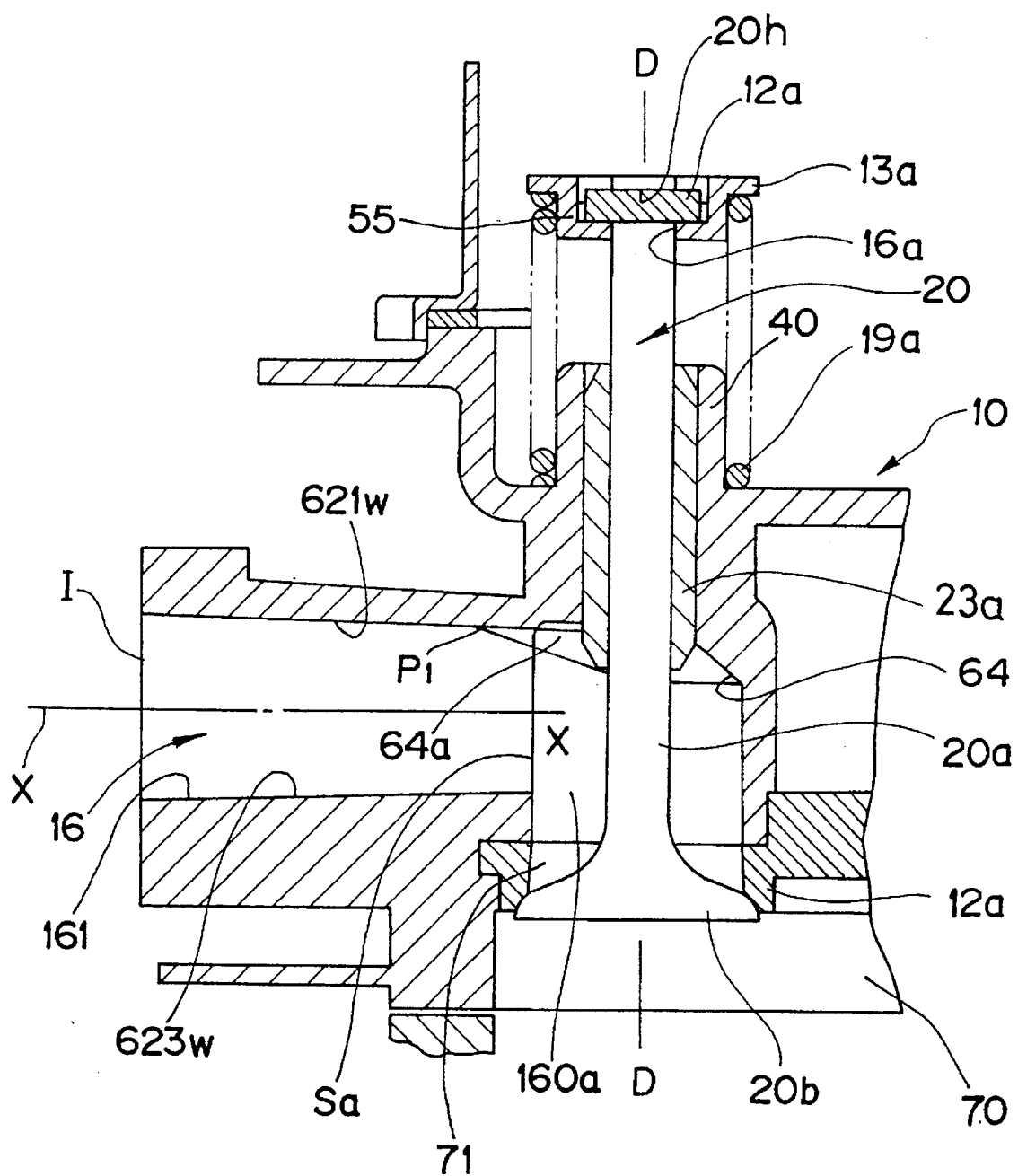
FIG. 2 shows a sectional view of an intake port and an intake valve according to this invention.
Figure 3:
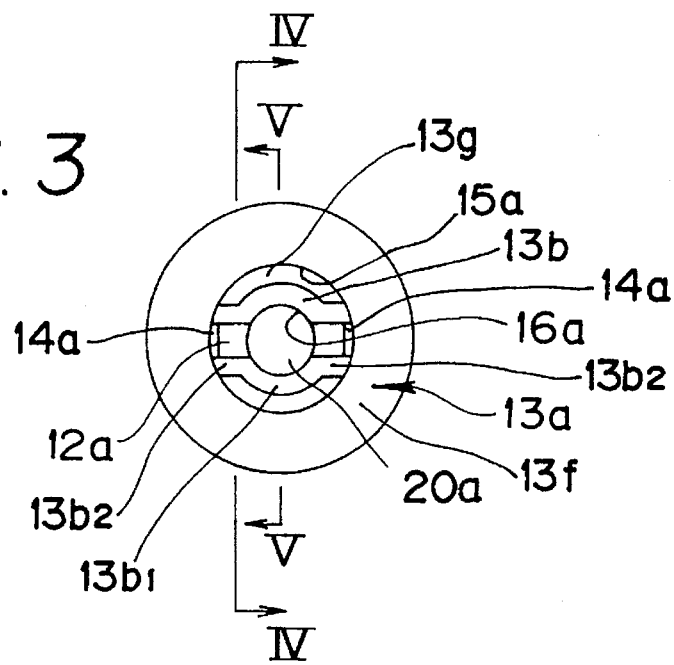
FIG. 3 shows a plan view of a valve retainer shown in FIG. 2.
Figure 4:
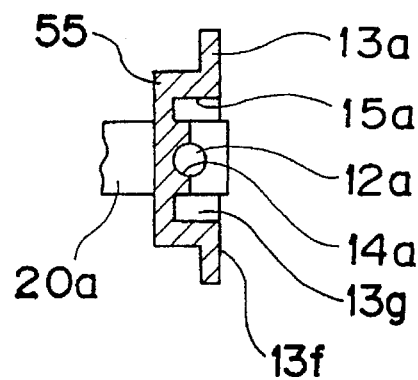
FIG. 4 shows a sectional view taken along the line IV—IV in FIG. 3.
Figure 5:
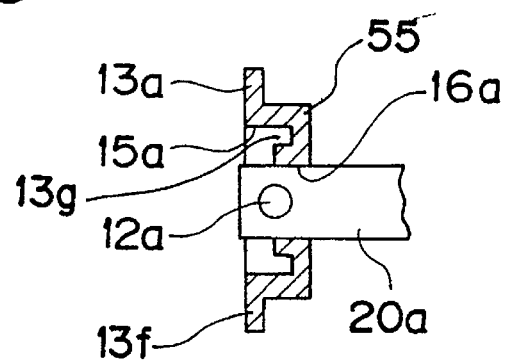
FIG. 5 shows a sectional view taken along the line V—V in FIG. 3.

Next, the shape of the lateral path 161 of the intake port 16 will now be explained with reference to FIGS. 2 and 7.

Figure 6:
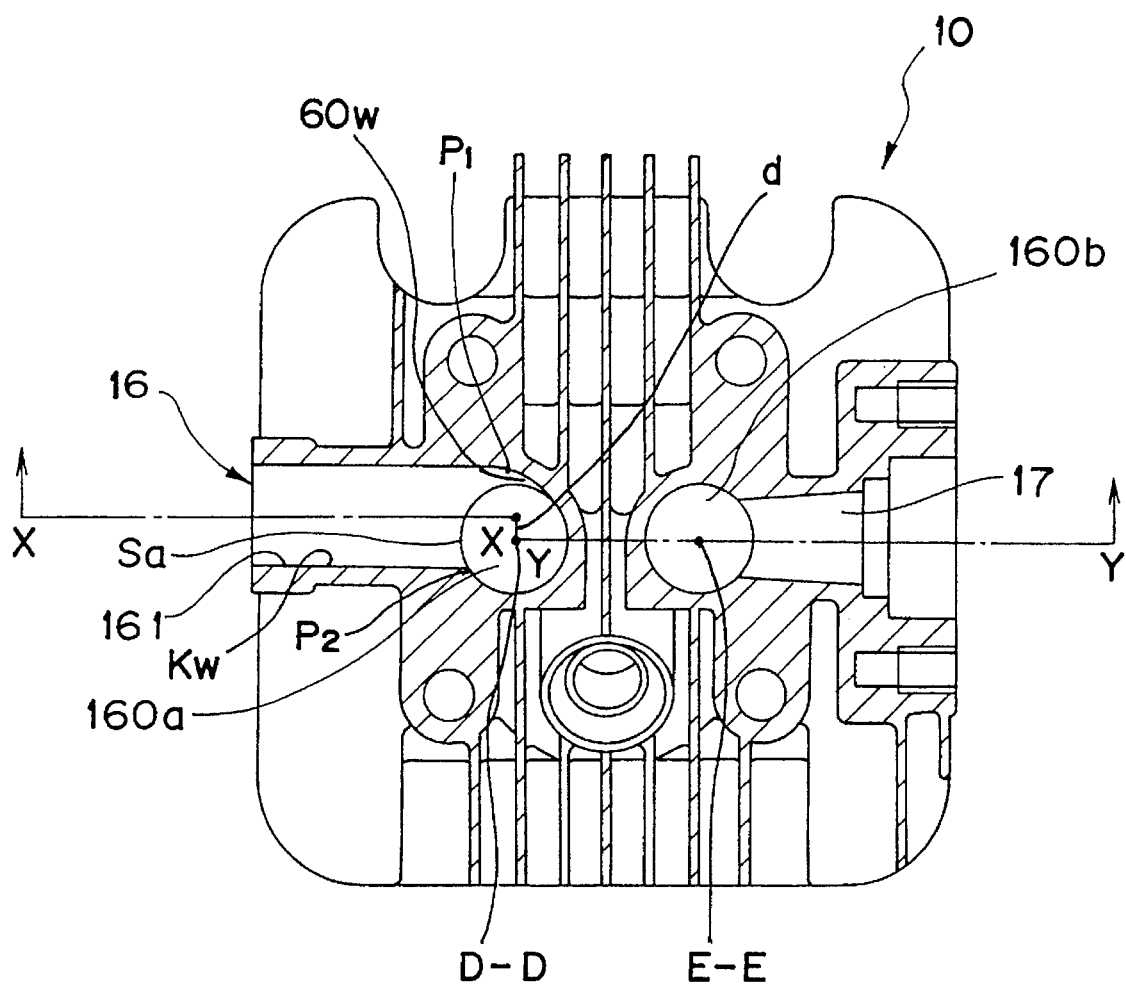
FIG. 6 shows a cross sectional view of a cylinder head according to this invention.
Figure 7:
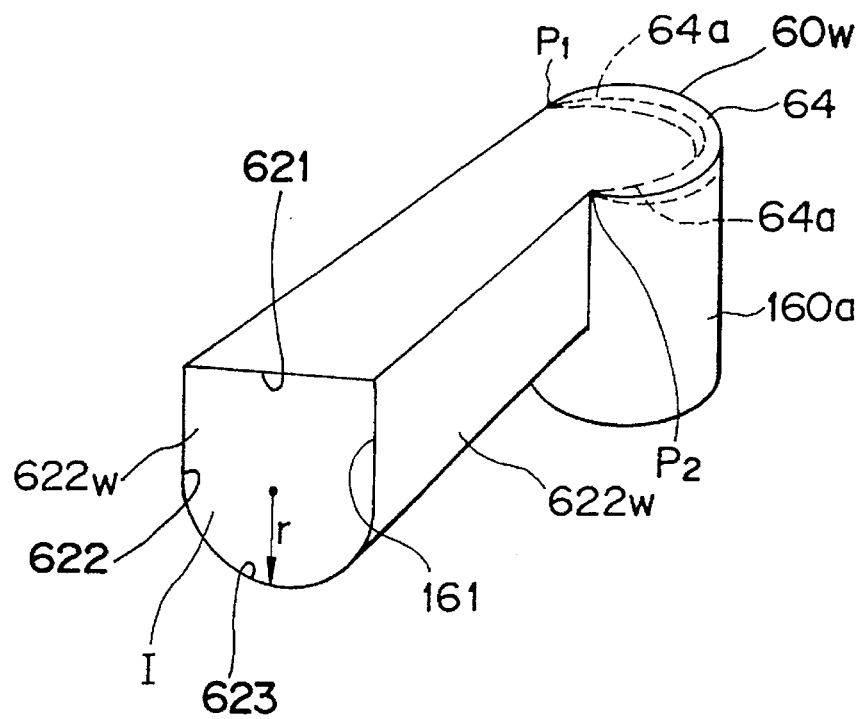
FIG. 7 shows a perspective view of the intake port shown in FIG.2.
Figure 8:
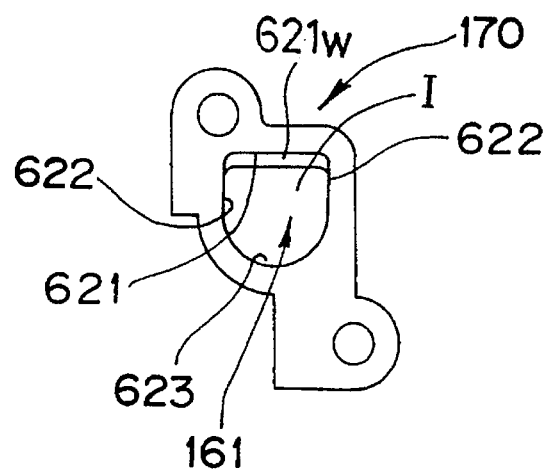
FIG. 8 shows a front view of the lateral path member of the intake port.
Figure 9:
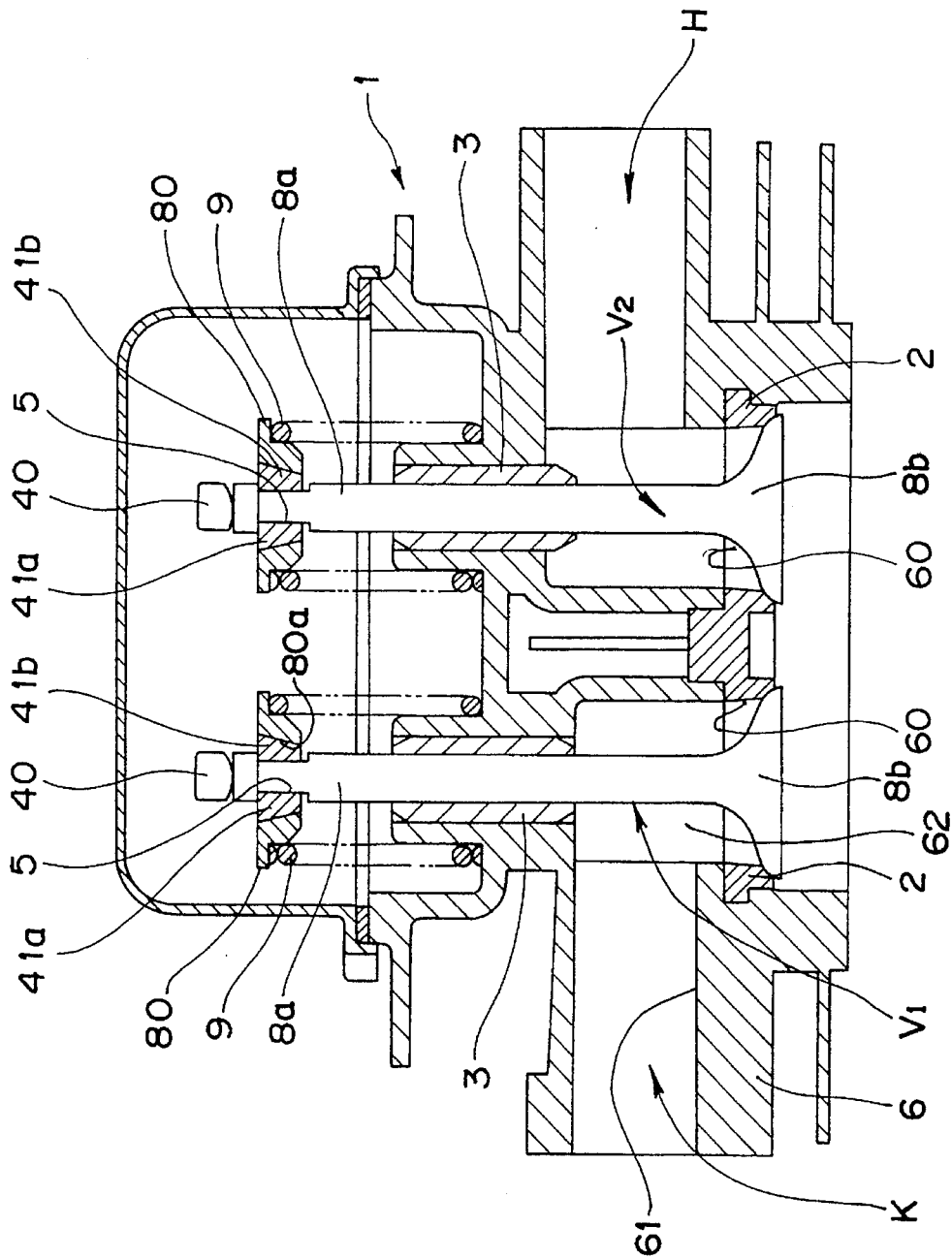
FIG. 9 shows a vertical sectional view of a conventional cylinder head.
Figure 10:
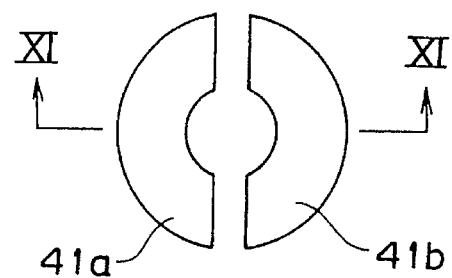
FIG. 10 shows a plan view of split two cotters shown in FIG. 9.
Figure 11:
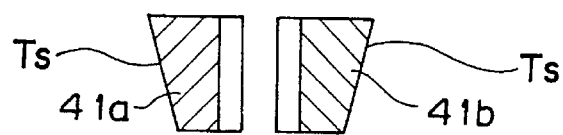
FIG. 11 shows a vertical sectional view of the split two cotters taken along the line XI—XI in FIG. 10.
Figure 12:
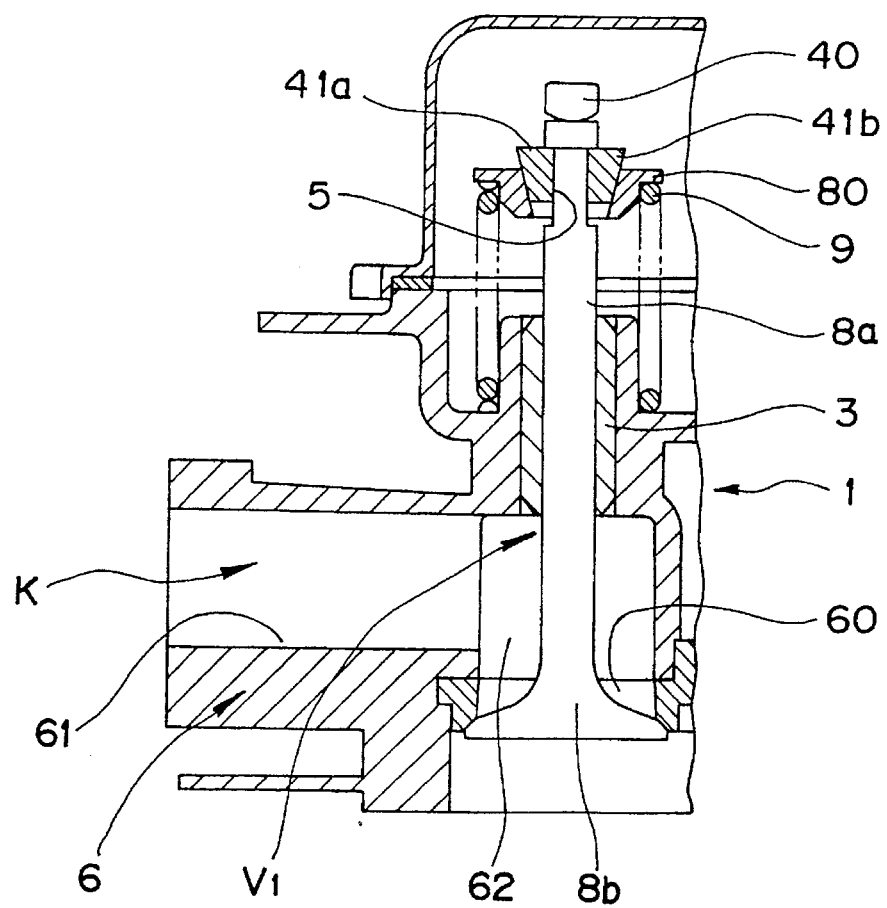
FIG. 12 shows a vertical sectional view of a conventional intake valve in which a valve retainer is assembled with the cotters in an abnormal state.
Figure 13:
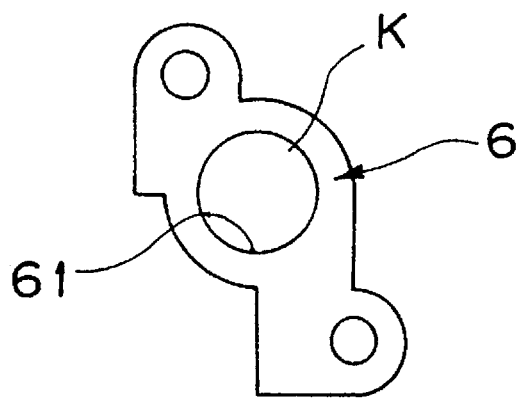
FIG. 13 shows a front view of a conventional lateral path member.

The lateral path 161 for guiding a mixture of fuel and air has a shape of a deep pan in a front view as shown in FIGS. 7 and 8. That is, the lateral path 161 has a horizontal straight upper side 621, two vertical straight sides 622 extended from the opposite sides of the horizontal straight upper side 621 and a semi-circular Side 623 having a radius r corresponding to a half length of the upper side 621 and connected between the lower ends of the two vertical straight sides 622, 622. The lateral path 161 is extended from the inlet I thereof toward the vertical path 160a in such a manner that the height of the lateral path 161 is gradually slightly decreased as it goes close to the vertical path 160a. The upper wall 621w of the lateral path 161 and the lower wall 623w thereof are obliquely extended symmetrically with respect to the axis X—X of the lateral path 161. Only the upper wall 621w may be slanted gradually with the lower wall 623w extended horizontally. The distance between the vertical walls 622w, 622w are not changed over the total horizontal length of the lateral path 161 as shown in FIG. 7. The axis X—X of the lateral path 161 is deviated by a distance d from the axis D—D (FIG. 2) of the vertical path 160a in a horizontal plane as shown in FIG. 6. Further, the axis X—X of the lateral path 161 is also deviated by a distance d from the axis Y—Y of the lateral path 162 of the exhaust port 17 in a horizontal plane. The axis D—D of the vertical path 160a (valve stem 20a) and the axis E—E of the vertical path 160b (valve stem 20b) (FIG. 1) are located in the same vertical plane including the axis Y—Y of the lateral path 162 of the exhaust port 17. Since the axis X—X of the lateral path 161 of the intake port 16 is deviated from the axis D—D of the vertical path 160a, a curved wall 60w is provided at a connecting portion between the inner end of the lateral path 161 and the side portion of the vertical path 160a as shown in FIG. 6, and the curved wall 60w is curved so as to be close to the axis X—X of the Second lateral path 161. Further, in FIG. 6, an adjacent portion between the circumferential portion of the ceiling wall of the vertical path 160a and a curved side wall thereof is slanted with respect to a cross sectional plane of the cylinder head 10 to form a flat slanted wall 64 from the starting point P₁ of the curved wall 60w to a connecting point P₂ between the inner wall kw of the lateral path 161 and the vertical path 160a (except a connecting portion Sa between the vertical path and the inner end of the second lateral path). Near the points P₁, P₂ are provided two gradually slanted portions 64a, 64a (FIGS. 2 and 7) for connecting the ceiling wall 621w of the vertical path 160a with a complete slanted wall 64 formed at a center portion between the two points P₁, P₂.

In such a structure of the intake port 16, since the height of the lateral path 161 of the intake port 16 is gradually decreased from the inlet thereof to the vertical path 160a, the flow rate of intake mixture is larger at the inlet of the lateral path 161 than that at a position on the side of the vertical path 160a. Further, the connecting portion Sa between the inner end of the lateral path 161 and the side portion of the vertical path 160a has a sufficient opening area to increase an intake efficiency of intake. That is, the flow of the mixture turns perpendicularly at the upper portion of the connecting portion Sa where the flow rate of the mixture becomes at the outer portion larger than at the inner portion thereof because of centrifugal force of gasmolecules. At the upper portion of the connecting portion Sa, the outer sectional area is large because of its peculiar shape. Therefore, a big flow rate of the mixture can be obtained at the outer portion thereof to generate a large tumbling flow. In addition, the slanted wall 64 having a flat surface is provided at the circumferential portion of the ceiling wall of the vertical path 160a, and, therefore, the mixture of fuel and air can be smoothly directed to the downward direction. At the connecting portion Sa, air flows at the outward side portion thereof more than at a position of the inner side portion thereof. Therefore, the intake efficiency of air and fuel is increased much more, and a swirl flow is formed in the direction of the center axis of the cylinder to generate a synergistic effect of the tumbler flow and the swirl flow. Thereby, contact between fuel and air is improved.

What is claimed is:

1. In a structure of intake and exhaust valves in a combustion engine in which intake and exhaust ports are opened and closed by intake and exhaust valves, respectively, the intake and exhaust valves having valve portions for opening and closing the intake and exhaust ports and valve stems for supporting the valve portions, each of the valve stems being provided, at its upper portion, with a valve retainer for receiving a spring force of a valve spring, each of the valve stems being engaged with a rocker arm to be moved so as to open and close the intake and exhaust ports, cooperating with the valve spring, wherein each of the valve stems has means for holding a connecting member to be detachably held by the valve stem, said means for holding the connecting member comprising a hole diametrically provided in the upper portion of the valve stem and extended perpendicularly to the axis of the valve stem, and the connecting member comprising a pin which is detachably held in the hole provided in the upper portion of the valve stem, and wherein the valve retainer comprises a center hole through which the upper portion of the valve stem passes, means for receiving an upper portion of the valve spring provided between the valve retainer and a wall of a cylinder head of the internal combustion engine, and means for supporting the connecting member held by the upper portion of the valve stem.

2. A structure of intake and exhaust valves according to claim 1, wherein the means for supporting the connecting member comprises a groove provided on the valve retainer to receive both ends of the pin held by the upper portion of the valve stem.

3. A structure of intake and exhaust valves according to claim 1, wherein the valve retainer has a shape of an ashtray which comprises a flange abutting against the upper end portion of the valve spring, a center recess surrounded by the flange to accommodate the upper end of the valve stem passing through the center hole of the valve retainer, and a raised portion provided around the center hole in the center recess, the means for supporting the connecting member being a groove diametrically formed on the raised portion.

4. A structure of intake and exhaust valves according to claim 1, wherein a shallow cup-like portion forming the center recess of the valve retainer is inserted into the upper portion of the valve spring in form of a coil with the lower surface of the flange abutting against the upper end portion of the valve spring.

5. In a structure of an intake port in an internal combustion engine in which mixture of air and fuel is supplied into a cylinder through the intake port, the intake port comprising:

a first vertical path, provided in a cylinder head, extending parallel to an axis of a cylinder, part of a valve stem of an intake valve being accommodated in the first vertical path, the first vertical path being opened to a combustion chamber of the cylinder through an opening portion which is opened and closed by a valve portion of the intake valve, and a second lateral path connected to the first vertical path and extending perpendicularly to an axis of the first vertical path, wherein the second lateral path has a shape of a deep pan in cross section which comprises a lateral straight side, two vertical sides suspended from opposite ends of the lateral straight side and a semi-circular side communicated with respective lower ends of the two vertical sides, height of the second lateral path in a direction of the axis of the cylinder being gradually decreased from an inlet of the second lateral path to the first vertical path, and wherein the second lateral path has a longitudinal axis perpendicular to the axis of the cylinder and parallel to a direction in which the intake valve and an exhaust valve are arranged, walls corresponding to said lateral straight side, said vertical sides and said semi-circular side being parallel to the longitudinal axis or being slanted so as to gradually come close to the longitudinal axis as it goes close to the first vertical path respectively.

6. A structure of an intake port according to claim 5, wherein at least one of an upper wall corresponding to the upper lateral straight side and a lower wall corresponding to the semicircular side is slanted with respect to an axis of the second lateral path.

7. A structure of an intake port according to claim 5, wherein the first vertical path has a slanted flat surface at an adjacent portion between a ceiling wall of the first vertical path and a curved side wall thereof except a connecting portion between the first vertical path and an inner end of the second lateral path.

8. In a structure of an intake port in an internal combustion engine in which mixture of air and fuel is supplied into a cylinder through the intake port, the intake port comprising:

a first vertical path, provided in a cylinder head, extending parallel to an axis of a cylinder, part of a valve stem of an intake valve being accommodated in the first vertical path, the first vertical path being opened to a combustion chamber of the cylinder through an opening portion which is opened and closed by a valve portion of the intake valve, and a second lateral path connected to the first vertical path and extending perpendicularly to an axis of the first vertical path, wherein the second lateral path has a shape of a deep pan in cross section which comprises a lateral straight side, two vertical sides suspended from opposite ends of the lateral straight side and a semi-circular side communicated with respective lower ends of the two vertical sides, height of the second lateral path in a direction of the axis of the cylinder being gradually decreased from an inlet of the second lateral path to the first vertical path, the first vertical path of the intake port being arranged in line with an exhaust port in a direction parallel to a longitudinal axis of the second lateral path, the second lateral path being deviated from the first vertical path in a direction perpendicular to both of the axis of the cylinder and the longitudinal axis, and wherein a curved surface for generating a swirl flow of the mixture of air and fuel is provided at a connecting portion between an inner end of the second lateral path and a side portion of the first vertical path.

* * * * *